| United States Patent [19] | [11] 3,950,315 |
| Cleaver | [45] Apr. 13, 1976 |

[54] CONTACT LENS HAVING AN OPTIMUM COMBINATION OF PROPERTIES

[75] Inventor: Charles S. Cleaver, Wilmington, Del.

[73] Assignee: E. I. Du Pont de Nemours and Company, Wilmington, Del.

[22] Filed: June 28, 1973

[21] Appl. No.: 374,571

Related U.S. Application Data

[63] Continuation-in-part of Ser. No. 152,073, June 11, 1971, abandoned.

[52] U.S. Cl. ............................ 260/86.1 E; 351/160
[51] Int. Cl.² ................................. C08F 214/18
[58] Field of Search ............... 351/160; 260/86.1 E; 450/717.5

[56] References Cited
UNITED STATES PATENTS

| 3,228,741 | 1/1966 | Becker | 351/160 |
| 3,475,521 | 10/1969 | Stroop | 351/160 |
| 3,503,942 | 3/1970 | Seiderman | 351/160 X |
| 3,542,461 | 11/1970 | Girard et al. | 351/160 |
| 3,808,179 | 4/1974 | Gaylord | 351/160 X |

*Primary Examiner*—Stanford M. Levin

[57] ABSTRACT

Disclosed herein is a contact lens constructed from a copolymer of methyl methacrylate and a fluoroester having a refractive index of 1.36 to 1.45, a Knoop hardness of 5 to 16, a tensile modulus of 50,000 to 250,000, oxygen and carbon dioxide permeability of at least about 300 centibarrers and a water content of not more than about 5% by weight of the lens material.

13 Claims, 3 Drawing Figures

U.S. Patent   April 13, 1976   3,950,315
FIG. 1
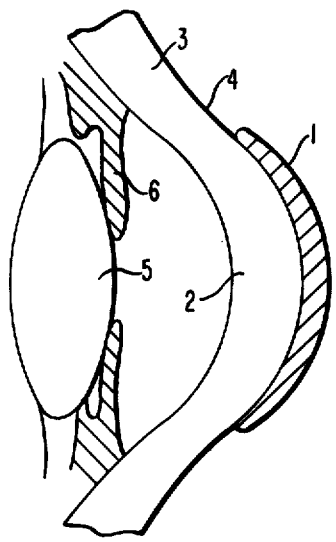
FIG. 2
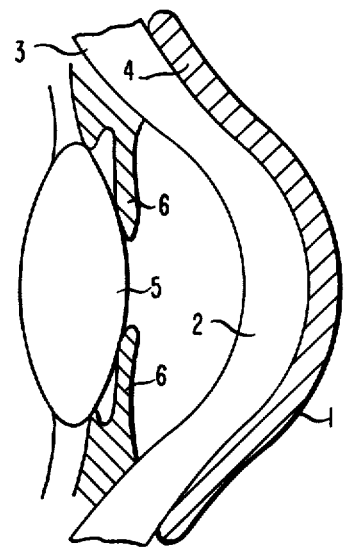
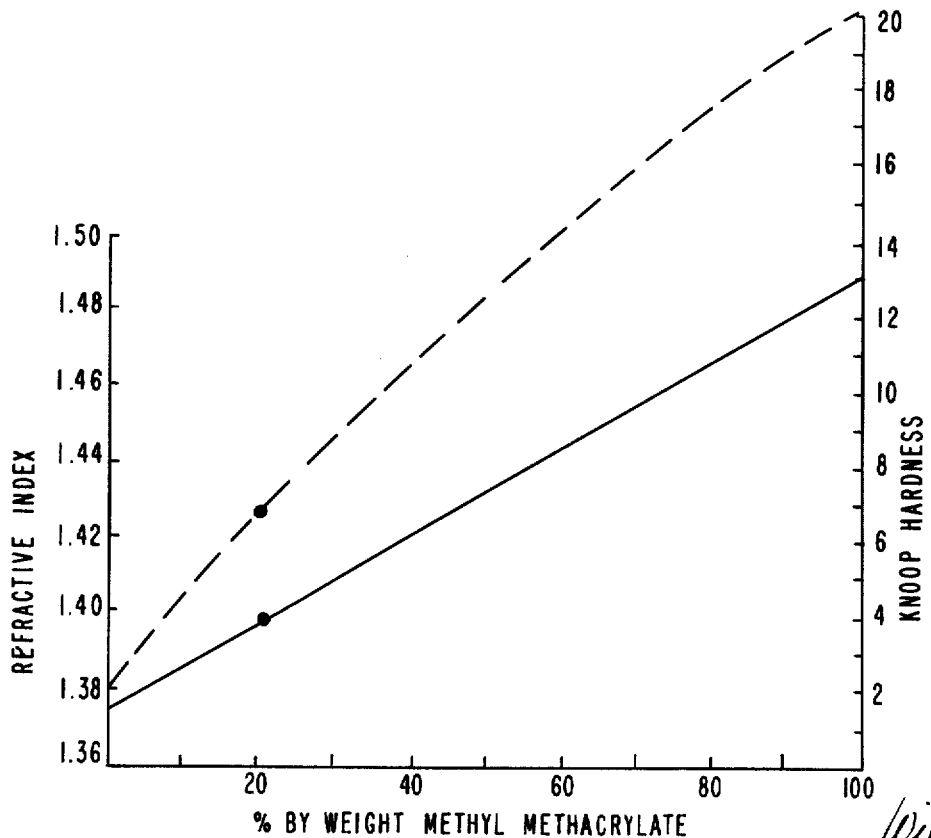
FIG. 3
INVENTOR
CHARLES S. CLEAVER
Wilkin E. Thomas Jr.
ATTORNEY

CONTACT LENS HAVING AN OPTIMUM COMBINATION OF PROPERTIES

CROSS REFERENCE TO RELATED APPLICATIONS

This application is a continuation-in-part of U.S. pat. application Ser. No. 152,073 which was filed on June 11, 1971, now abandoned.

BACKGROUND OF THE INVENTION

1. Field of the Invention

This invention relates to a novel contact lens of the type applied to the human eye to correct vision deficiencies 2. Description of the Prior Art Although known and used for years, contact lenses have not been accepted fully by most persons having vision difficulties. Contact lenses are generally of two types, scleral and corneal. Those of the scleral type cover a substantial area of the eye during use. This tends to seal off circulation of tears and the atmosphere, thereby causing partial asphyxiation which affects the metabolism and vision of the eye. The more recent corneal lenses, which because of their relatively smaller size and lighter weight, may cause less irritation, have, therefore, achieved somewhat greater acceptance. However, the "break-in" period necessary to accustom the eye of the wearer to support a corneal lens, as well as a scleral lens, usually extends over a considerable time, and some persons have found contact lenses in any form intolerable because of the eye irritation and even corneal changes that occur during and after extended periods of wear.

Contact lenses of both the corneal and scleral types have been commonly constructed from poly (methyl methacrylate) (PMMA) which has a Knoop hardness of about 20. This material has the advantage of being both lightweight and machinable, but when a PMMA corneal contact lens is introduced for the first time into the eye of a patient, the sensation is that of a foreign body being introduced. A fraction of those who try PMMA lenses become adapted to them after the break-in period so that they can successfully wear them with little or no discomfort. A larger fraction of those who attempt to wear them never become wearers because they cannot adapt to the lenses. Even those individuals who adapt successfully to PMMA lenses suffer an awareness of the lens in the eye. This is partly because of the stiffness of the lens and partly because the eye becomes deprived of oxygen due to the low permeability of PMMA to oxygen.

Many attempts have been made to design scleral and corneal contact lenses for comfort and for proper fluid circulation. U.S. Pat. No. 3,542,461 discloses the advantage of constructing contact lenses from a material having a refractive index near the refractive index of tears, i.e., about 1.336. U.S. Pat. No. 3,228,741 discloses the advantage of constructing lenses from a material having high $O_2$ and $CO_2$ permeability to reduce eye irritation caused by asphyxiation and suggests the use of a transparent silicone rubber to achieve this high permeability. U.S. Pat. No. 3,551,035 suggests a more rigid material, poly(4-methyl pentene-1) for the same purpose. Finally U.S. Pat. No. 3,220,960 discloses the comfort advantage of lenses which are made from soft hydrogel materials, but these materials generally suffer from a lack of dimensional stability, which causes the power of the lens to change during wear. They are also prone to bacterial growth, because of the high water content, and also appear to draw water from the eye.

An ideal contact lense, by definition, lens, a contact lens having an index of refraction close to that of tears, a reasonably high permeability to oxygen and carbon dioxide and a low water content. The lens should also be as soft and flexible as possible, yet hard enough to be machined and polished. The alternative process of molding the lens is feasible, but expensive since a large number of molds would be needed to satisfy the various optical needs of prospective wearers. The advantages of each of the various properties has been recognized, but no one has yet been able to produce a contact lens which has an optimum combination of these properties. The proponent of each property merely seeks a material having the particular advantage in which he is interested and generally accepts what he can get relative to the other properties. I have invented a new contact lens which has a combination of properties that are so close to the ideal combination of properties that the lens can indeed be considered an ideal contact lens.

SUMMARY OF THE INVENTION

The invention comprises a contact lens constructed from a fluorine-containing copolymer having a refractive index of about 1.36 to about 1.45, a Knoop hardness of about 5 to about 16, preferably 5 to 12, a tensile modulus of about 50,000 to about 250,000 psi and a water content of no more than about 5% by weight. The lens should also have a reasonably high permeability to oxygen and carbon dioxide to avoid or at least ameliorate the corneal asphyxiation that occurs with many low permeability lens materials. By present standards lenses with oxygen and carbon dioxide permeabilities of a few hundred centibarrers (i.e., about 300 cB) are considered to have a reasonably high permeability, but the preferred lens has a permeability to oxygen and carbon dioxide of at least about 1000 cB.

The fluorine-containing copolymers used to achieve these characteristics contain about 10–70% by weight of methyl methacrylate and about 30–90% by weight of at least one methacrylate of a fluorine substituted alcohol, preferably one selected from the group consisting of perfluoroalkyl alkyl methacrylates of the formula

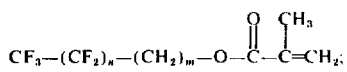

telomer alcohol methacrylates of the formula

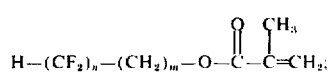

and mixtures thereof, where $n$ is an integer of from 1 to 13 and $m$ is an integer of from 1 to 5, preferably 1 or 2.

Particularly useful in the manufacture of the lenses of the present invention are those fluoroesters selected from the group consisting of perfluoroalkyl ethyl methacrylates of the formula

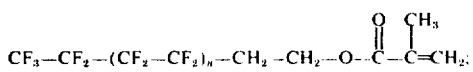

perfluoroalkyl methyl methacrylates of the formula

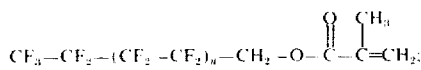

telomer alcohol methacrylates of the formula

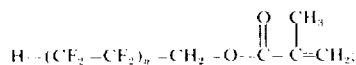

and mixtures thereof, where $n$ is in each case an integer of from 1 to 5.

In the preferred embodiment, the fluorine-containing copolymer contains about 10 to about 50% by weight of methyl methacrylate and about 50 to about 90% by weight of either perfluoroalkyl ethyl methacrylate or perfluoroalkyl methyl methacrylate as the fluoroester, with a particularly useful composition being a fluorine-containing copolymer comprising a copolymer of about 20% by weight of methyl methacrylate and about 80% by weight of perfluoroalkyl ethyl methacrylate.

The ratio of the various components in the compositions disclosed above will affect the properties of the lens, particularly the oxygen permeability. For example, it has been found that oxygen permeability varies inversely with ($m$) and directly with ($n$); inversely with the percentage of methacrylate used and directly with the percentage of fluoroester used. In particular, copolymers containing perfluoroalkyl alkyl methacrylates are more permeable than those containing ω-hydro fluoroalkyl alkyl methacrylate. In general then, all of the copolymers discussed above will have a reasonably high oxygen permeability, but careful selection, well within the capability of one skilled in the art, will produce a lens having an oxygen permeability greater than 1000 cB.

What has been achieved by the use of these materials is a contact lens which for the first time has a combination of properties vastly superior to the combination of properties found in any other lens material. The lens of the present invention has a refractive index which is sufficiently close to that of tears so that the lens is flare free. It also has a Knoop hardness which is sufficiently high so that the lens can be machined and polished and a modulus which is sufficiently low that the lens can conform to the eye. Furthermore, the lens is sufficiently permeable to oxygen and carbon dioxide to prevent the irritation that normally accompanies oxygen deprivation and it contains insufficient water to support bacterial growth, another source of eye irritation. Finally, it appears that the low surface friction of the fluorine-containing polymer from which the lens is made contributes to reduced eye irritation.

The present invention can best be described by reference to the following figures and examples.

BRIEF DESCRIPTION OF THE DRAWINGS

FIG. 1 is a vertical cross-sectional view of a portion of a human eye to which has been applied a corneal contact lens that forms one embodiment of this invention.

FIG. 2 is a vertical cross-sectional view of a portion of a human eye to which has been applied a scleral contact lens that forms one embodiment of this invention. The lenses shown in FIGS. 1 and 2 are of a generally concave-convex cross-section, with the concave surface adjacent to the eye.

FIG. 3 is a plot of the refractive index and Knoop hardness of copolymers of perfluoroalkyl ethyl methacrylate and methyl methacrylate as a function of the percent by weight of methyl methacrylate in the copolymer.

In FIGS. 1 and 2, the contact lens is represented by numeral 1, and in the eye, the cornea is 2, the sclera is 3, the limbus is 4, the lens is 5, and the iris is 6. It should be noted that between the eye and the lens is a tear layer that is not shown in the drawing.

DETAILS OF THE INVENTION

The lenses of this invention are constructed from transparent, dimensionally stable, solid materials characterized by: an index of refraction of about 1.36 to about 1.45; a Knoop hardness of about 5 to 16, preferably 5 to 12, which makes them just hard enough to be machinable and polishable; a tensile modulus of about 50,000 to 250,000 psi which makes them pliable enough not to be brittle and also pliable enough so that they can be deformed slightly at their edges to conform to the eye; an oxygen and carbon dioxide permeability of at least about 300 cB and, preferably 1000 cB; and a water content of no more than about 5% by weight of the total material present in the lens.

The polymers from which the contact lenses of the present invention are prepared are copolymers of methyl methacrylate and certain fluoroesters, which are copolymerizable with methyl methacrylate, specifically those fluoroesters selected from the group consisting of perfluoroalkyl alkyl methacrylates of the formula

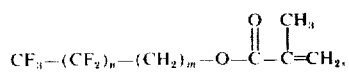

where $n$ is an integer of from 1 to 13, and $m$ is 1 or 2, and telomer alcohol methacrylates of the formula

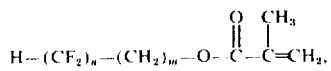

where $n$ is an integer of from 1 to 13 and $m$ is 1 or 2. The following fluoroesters which are copolymerizable with methyl methacrylate have been found to be particularly useful in this context: perfluoroalkyl ethyl methacrylates of the formula

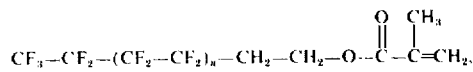

preferably perfluoro-n-hexyl ethyl methacrylate which has the formula

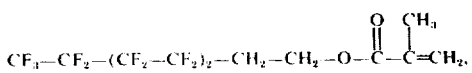

and perfluoroalkyl methyl methacrylates of the formula

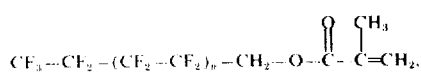

preferably perfluoro-n-hexyl methyl methacrylate which has the formula

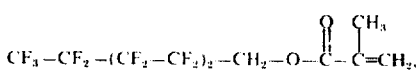

telomer alcohol methacrylates of the formula

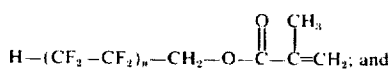

mixtures thereof where, in each case, $n$ is an integer of from 1 to 5.

The perfluoroalkyl ethyl methacrylate monomers mentioned above and a process for their production are disclosed in U.S. Pat. Nos. 3,282,905 and 3,542,461. Perfluoroalkyl methyl methacrylate and perfluoroalkyl propyl methacrylate monomers and a process for their manufacture are disclosed in U.S. Pat. No. 2,642,416 and U.S. Pat. No. 3,102,103. Finally, telomer alcohol methacrylate monomers and a process for their manufacture and disclosed in U.S. Pat. No. 2,628,958. The techniques for producing these fluoroesters commonly yield mixtures containing a major proportion of the particular fluoroester desired and various homologs of that fluoroester. The pure fluoroesters and the mixtures are both useful as contact lens materials. The methods for copolymerizing these monomers with methyl methacrylate will be discussed in the examples below.

Homopolymers of the fluoroesters discussed above generally have a Knoop hardness of about 2.0. This is generally too low to be machinable and/or polishable, although contact lenses can be made from them by molding, as disclosed in U.S. Pat. No. 3,542,461. Furthermore, they have a low refractive index, generally below 1.4. I have found that by copolymerizing selected amounts of methyl methacrylate with the fluoroester, the Knoop hardness can be raised to the 5 to 16 range and preferably the 5 to 12 range, without raising the refractive index appreciably and without causing the lenses to be brittle, as are pure PMMA lenses. I have also found that these copolymers, having a Knoop hardness of 5–12, can be machined and polished into the form of a lens. Not all materials having a Knoop hardness below 12 can be so processed. The ability to machine and polish the lenses provides a manufacturing advantage over molding, for the reasons discussed above.

The solid line in FIG. 3 illustrates the increase in refractive index of a copolymer of perfluoroalkyl ethyl methacrylate and methyl methacrylate as the methyl methacrylate content is increased. The dotted line illustrates the increase in Knoop hardness of the same material as the methyl methacrylate content is increased. From this graph, it can be seen that the incorporation of about 10% by weight of methyl methacrylate in the copolymer increases the Knoop hardness to about 5 and the refractive index to about 1.38; and that the addition of about 20% by weight of methyl methacrylate to the copolymer increases the Knoop hardness to about 6.5 and the refractive index to about 1.4. At about 50% by weight of methyl methacrylate, the Knoop hardness is about 12 and the refractive index about 1.43. Finally at about 70% by weight of methyl methacrylate, the Knoop hardness is about 16 and the refractive index about 1.45. With 10 to 70% by weight of methyl methacrylate, then the refractive index is kept below about 1.45 and the Knoop hardness is kept between 5 to 16.

PREFERRED EMBODIMENTS

The following examples are offered to illustrate but not to limit the invention. The parts recited are in all cases parts by weight unless otherwise specified.

EXAMPLE 1

Eighty parts of a fluoroester comprising primarily fluoroesters of the formula

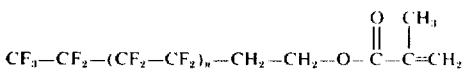

where $n$ is 2 and 3, and 20 parts of methyl methacrylate are copolymerized under nitrogen at 50°C. for 4 hours, then at 90°C. for 3 hours using 0.15 part of 2,2'-azobis-(iso butyronitrile) as a catalyst. After cooling, the polymer is broken into chunks, further pulverized in a Cumberland cutter, extraction extruded to remove residual volatiles and finally pelletized.

Gas chromatographic analysis of the fluoroester used indicates that it contained about 62% of a fluoroester of the above formula in which $n$ equals 2; about 33% of a fluoroester of the above formula in which $n$ equals 3; and a small amount of fluoroesters of the above formula in which $n$ equals 1, 4 and 5. As discussed above, the techniques for producing the fluororester of this example commonly yield such mixtures, but the major components of the mixture can vary widely in composition and still give acceptable lens copolymers.

The particular catalyst used in this process was 2,2'-azobis(iso butyronitrile) but any suitable free radical catalyst well known to those skilled in the art can also be used.

The polymer pellets are then molded into lens blanks or melt cast into a sheet and lens blanks are stamped from this sheet. The lens blanks are then machined and polished into prescription lenses using techniques well known to the art.

The lenses so formed have a refractive index of 1.4, a Knoop hardness of 6.5, a tensile modulus of 140,000 psi, a density of 1.57 grams per cc., oxygen permeability of 2,500 centibarrers and carbon dioxide permeability of 8,700 centibarrers and a water content of less than 5% by weight.

EXAMPLE 2

The process of Example 1 is repeated except that a fluoroester comprising primarily a fluoroester of the formula

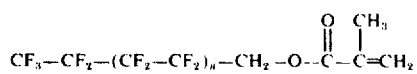

where $n$ is predominantly 2 but which contains minor amounts of other fluoroesters of the formula with $n$ being 1 to 5, is substituted for the fluoroester of Example 1. Lenses made from this copolymer will have the combination of properties set forth above.

EXAMPLE 3

The process of Example 1 is repeated except that a fluoroester comprising primarily a fluoroester of the formula

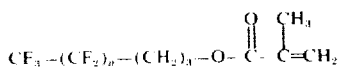

where n is predominantly 5, but which contains other minor amounts of fluoroesters of the formula with $n$ being 1 to 13, is substituted for the fluoroester of Example 1. Lenses made from this copolymer will have the combination of properties set forth above.

EXAMPLE 4

The process of Example 1 is repeated except that a fluoroester comprising primarily a fluoroester of the formula

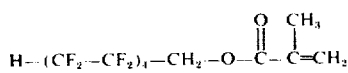

is substituted for the fluoroester of Example 1. Lenses made from the copolymer will have an index of refraction of 1.41, a Knoop hardness of 7.3, an oxygen permeability of 370cB, a carbon dioxide permeability of 1800 cB and a water content of less than 5% by weight.

What is claimed is:

1. A contact lens, for providing optical correction to an eye, said lens having a generally concave-convex cross-section, with the concave surface adjacent to the eye, and being constructed from a fluorine-containing polymer having a refractive index of about 1.36 to about 1.45, a Knoop hardness of about 5 to about 16, a tensile modulus of about 50,000 to about 250,000 psi, a permeability to oxygen and carbon dioxide of at least about 300cB, and no more than about 5% by weight of water content, said fluorine-containing polymer being a copolymer of about 10 to 70% by weight of methyl methacrylate and about 30 to 90% by weight of at least one methacrylate of a fluorine substituted alcohol.

2. The contact lens of claim 1 in which the lens has a permeability to oxygen and carbon dioxide of at least about 1000 cB.

3. A contact lens, for providing optical correction to an eye, said lens having a generally concave-convex cross-section, with the concave surface adjacent to the eye, and being constructed from a fluorine-containing polymer having a refractive index of about 1.36 to about 1.45, a Knoop hardness of about 5 to about 16, a tensile modulus of about 50,000 to about 250,000 psi, a permeability to oxygen and carbon dioxide of at least about 300 to centibarrers and no more than about 5% by weight of water content, said fluorine-containing polymer being a copolymer of about 10 to 70% by weight of methyl methacrylate and about 30 to 90% by weight of at least one fluoroester selected from the group consisting of perfluoroalkyl alkyl methacrylates of the formula

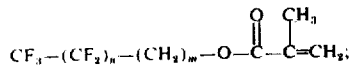

telomer alcohol methacrylates of the formula

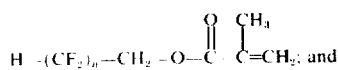

mixtures thereof, where $n$ is an integer of from 1 to 13 and $m$ is an integer of from 1 to 5.

4. The contact lens of claim 3 in which the lens has a permeability to oxygen and carbon dioxide of at least about 1000 cB.

5. The contact lens of claim 3 wherein $m$ is 1 or 2.

6. The contact lens of claim 5 wherein said fluoroester is perfluoroalkyl ethyl methacrylate and $n$ is either 2 or 3.

7. The contact lens of claim 5 wherein said fluoroester is a mixture of perfluoroalkyl ethyl methacrylate and $n$ is predominantly 2 and 3.

8. The contact lens of claim 5 wherein said fluoroester is a mixture of perfluoroalkyl methyl methacrylate and $n$ is predominantly 2 and 3.

9. The contact lens of claim 5 wherein said fluoroester is perfluoroalkyl methyl methacrylate and $n$ is either 2 or 3.

10. The contact lens of claim 9 wherein said fluorine-containing polymer is a copolymer of about 10 to 50% by weight of methyl methacrylate and about 50 to 90% by weight of said fluoroester.

11. A contact lens, for providing optical correction to an eye, said lens having a generally concave-convex cross-section, with the concave surface adjacent to the eye, and being constructed from a fluorine-containing polymer having a refractive index of about 1.36 to about 1.45, a Knoop hardness of about 5 to about 16, a tensile modulus of about 50,000 to about 250,000 psi, a permeability to oxygen and carbon dioxide of at least about 300 cantibarrers, and no more than about 5% by weight of water content, said fluorine-containing polymer being a copolymer of about 10 to 70% by weight of methyl methacrylate and about 30 to 90% by weight of at least one fluoroester selected from the group consisting of perfluoroalkyl ethyl methacrylates of the formula

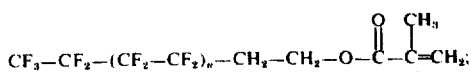

perfluoroalkyl methyl methacrylates of the formula

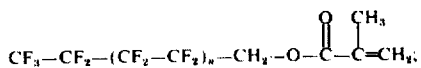

telomer alcohol methacrylates of the formula

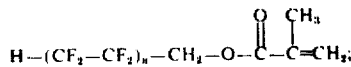

and mixtures thereof, where $n$ is in each case an integer of from 1 to 5.

12. A contact lens, for providing optical correction to an eye, said lens having a generally concave-convex cross-section, with the concave surface adjacent to the eye, and being constructed from a fluorine-containing polymer having a refractive index of about 1.36 to about 1.45, a Knoop hardness of about 5 to about 16, a tensile modulus of about 50,000 to about 250,000 psi, a permeability to oxygen and carbon dioxide of at least about 1000 centibarrers and no more than about 5% by weight of water content, said fluorine-containing polymer being a copolymer of about 20% by weight of methyl methacrylate and about 80% by weight of a mixture of perfluoroalkyl alkyl methacrylates of the formula

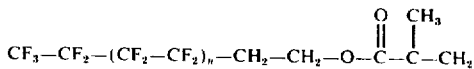

where $n$ is predominantly 2 and 3.

13. As a new article of manufacture, a contact lens having increased oxygen permeability, said lens being fabricated from a composition having a refractive index from about 1.36 to about 1.45, said composition being a solid copolymer of comonomers consisting essentially of:

a. about 30 to 90 parts by weight of a fluoroalkyl ester of the structure

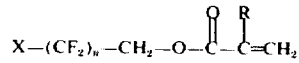

wherein:
1. X is selected from the class consisting of hydrogen and fluorine;
2. R is selected from the class consisting of methyl groups; and
3. $n$ is an integer from 1 to 13, and b. about 70 to 10 parts by weight of an ester of a $C_1$ monohydric alkanol and an acid selected from the class consisting of methacrylic acid.

* * * * *